United States Patent [19]

Tobias

[11] 3,728,408

[45] Apr. 17, 1973

[54] CONVERSION OF POLAR COMPOUNDS USING HIGHLY SILICEOUS ZEOLITE-TYPE CATALYSTS

[75] Inventor: Michael A. Tobias, Piscataway, N.J.

[73] Assignee: Mobil Oil Corporation, New York, N.Y.

[22] Filed: May 5, 1969

[21] Appl. No.: 821,940

[52] U.S. Cl. ............260/668 C, 252/455 Z, 260/290, 260/497, 260/568, 260/593, 260/609, 260/621, 260/631, 260/671 C
[51] Int. Cl. .................................................. C07c 1/20
[58] Field of Search ................................260/668 C; 252/455 Z; 23/111, 112, 113

[56] References Cited

UNITED STATES PATENTS

| | | | |
|---|---|---|---|
| 3,308,069 | 3/1967 | Wadlinger et al. | 252/455 |
| 3,442,795 | 5/1969 | Kerr et al. | 208/120 |

*Primary Examiner*—Curtis R. Davis
*Attorney*—Oswald G. Hayes, Andrew L. Gaboriault and Raymond W. Barclay

[57] ABSTRACT

A method of converting an organic polar compound comprising contacting the same in a conversion zone under conversion conditions with a crystalline aluminosilicate catalyst the silica/alumina ratio of which is more than 10/1.

4 Claims, No Drawings

CONVERSION OF POLAR COMPOUNDS USING HIGHLY SILICEOUS ZEOLITE-TYPE CATALYSTS

This invention relates to a process of converting organic polar compounds through the use of highly siliceous, zeolite-type catalysts.

Zeolite materials, both natural and synthetic, have been demonstrated in the past to have catalytic capabilities for various types of hydrocarbon conversion. Certain zeolite materials are ordered crystalline aluminosilicates having a definite crystalline structure within which there are a large number of small cavities which are interconnected by a number of still smaller holes or channels. These cavities and channels are uniform in size. Since the dimensions of these pores are such as to accept for adsorption molecules of certain dimensions while rejecting those of larger dimensions, these materials have come to be known as "molecular sieves" and are utilized in a variety of ways to take advantage of these properties.

Such molecular sieves include a wide variety of positive ion-containing crystalline aluminosilicates, both natural and synthetic. These aluminosilicates can be described as a rigid three-dimensional network of $SiO_4$ and $AlO_4$ tetrahedra in which the tetrahedra are cross-linked by the sharing of oxygen atoms whereby the ratio of the total aluminum and silicon atoms to oxygen atoms is 1:2. The electrovalence of the tetrahedra containing aluminum is balanced by the inclusion in the crystal of a cation, for example, an alkali metal or an alkaline earth metal cation. This equilibrium can be expressed by formula wherein the ratio of $Al_2$ to the number of the various cations, such as Ca, Sr, $Na_2$, $K_2$ or $Li_2$, is equal to unity. One cation may be exchanged either in entirety or partially by another cation utilizing ion exchange techniques. By means of such cation exchange, it is possible to vary the size of the pores in the given aluminosilicate by suitable selection of the particular cation. The spaces between the tetrahedra are occupied by molecules of water prior to dehydration. The parent zeolite is dehydrated to activate it for use as a catalyst.

A description of such zeolites is found in U.S. Pat. Nos. 2,882,243, 2,971,824, 3,033,778 and 3,130,007, whose disclosures are hereby incorporated herein by reference.

In said copending application Ser. No. 494,846, now U.S. Pat. No. 3,442,795, (the disclosure of which is hereby incorporated herein by reference), novel methods are disclosed for forming crystalline aluminosilicate molecular sieve catalysts having high silica/alumina ratios. By virtue of the processes disclosed in said copending application, such high silica/alumina ratio materials may be prepared from existing crystalline aluminosilicates having low silica/alumina ratios through the selective removal of aluminum by means of a combined solvolysis-chelation technique. The resulting highly siliceous crystalline aluminosilicates have a crystalline character exhibiting a shift to shorter metal-oxygen interatomic distances (measured as lattice cell constant, $a_o$) yet, at the same time, possessing one or more enhanced catalytic properties as compared with the starting material.

As pointed out in said copending application, the high silica/alumina crystalline aluminosilicates formed by said solvolysis-chelation techniques are characterized by a hydrocarbon adsorption capacity greater than would be theoretically calculated from a combined X-ray diffraction and elemental chemical analysis of said crystalline alumino-silicates. Stated differently, said crystalline aluminosilicates are characterized by an X-ray diffraction pattern which indicates by conventional interpretation the presence of silicon not actually present in said aluminosilicates, said aluminosilicates being alumina-deficient as compared with the aluminosilicates from which they are made, both said aluminosilicates and said aluminosilicates from which they are made having the same quantity of silica per unit cell.

In said copending application Ser. No. 494, 846, it is pointed out that such highly siliceous catalysts find extensive utility for transforming organic compounds which are catalytically convertible in the presence of acidic catalyst sites into modified organics. It is pointed out that the catalysts in question are exceptionally stable in a variety of enumerated processes which may be carried out at temperatures ranging from ambient temperatures of 70°F. up to 1400°F., including processes in which the catalyst is periodically regenerated by burning off combustible deposits.

Among the organic conversion reactions mentioned in said copending application Ser. No. 494, 846 are a number of reactions involving the conversion of polar organic compounds such, for example, as the dehydration of alcohols, alkylation of phenols, oxidation of alcohols and ketones, acids and the like, desulfurization of hydrocarbons, hydrogenation of alcohols, ketones and acids and the production of caprolactam from caprolactone and ammonia. Such copending application also discloses a number of reactions involving the formation of polar organic compounds as reaction products such, for example, as organic oxides from the oxidation of hydrocarbons including specifically the formation of ethylene oxide, propylene oxide, cyclohexanone, cyclohexanol and adipic acid, and the production of vinyl chlorides. It is to such reactions that the present application is directed. More specifically, the inventions of the present application are based on the recognition that highly effective results are obtained by using highly siliceous crystalline aluminosilicate catalysts to catalyze the conversion of polar organic compounds.

In accordance with the present invention, it has been discovered that the reactions of polar compounds (the definition of which will be defined below) utilizing crystalline aluminosilicate catalysts have reaction efficiencies which are affected by the silica/alumina ratio of the catalysts. More specifically, it has been discovered that such catalysts with silica/alumina ratios greater than 10 appear more hydrophobic than are such catalysts with lower silica/alumina ratios. As a result, high yields are produced in reactions of polar organics when catalysts with silica/alumina ratios greater than 10 are employed. The significance of the above unrecognized property of zeolites with silica/alumina ratios of greater than 10 as applied to the conversion of polar organic compounds is readily appreciated in light of the following analysis.

Because of the dipole in all polar compounds, crystalline aluminosilicate catalysts tend to selectively adsorb polar compounds at the active sites on said crystalline aluminosilicate catalysts. In reactions involving two different reactants this phenomenon is critical because the efficiency of the reaction depends on the percentage of both reactants which occupy these active sites. In crystalline aluminosilicate zeolite catalysts with silica/alumina ratios greater than 10, there are less active sites, making the catalysts more hydrophobic. The ability of high silica/alumina ratio zeolites to adsorb polar compounds less selectively than do low silica/alumina ratio zeolites in a system with more than one reactant, apparently results in less blockage of active sites and permits the adsorption of another, less polar reactant.

In a reaction such as equation 1, this adsorption factor appears critical:

Equation 1

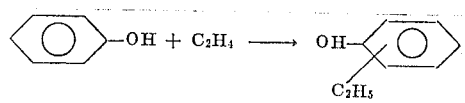

The above reaction is believed to occur more efficiently in the high silica/alumina ratio zeolites because both the phenol and ethylene molecules can be adsorbed by the zeolite. With high silica/alumina ratio zeolites, there is less blockage of the active site by the phenol (the polar reactant) allowing adsorption of the ethylene (the less polar reactant). The problem which the high silica/alumina ratio zeolites solve is self-inhibition of (net) reaction by one of the reactants. In the above example, a prerequisite for the reaction to occur is that some ethylene be adsorbed by the catalyst. With low ratio zeolites this prerequisite may not occur because the sites become blocked by phenol.

Not only do the zeolite catalysts employed in the instant invention appear to adsorb the reactants in more efficient ratios, but once a reaction occurs the reaction products may be more easily removed from such catalysts than is the case with low silica/alumina ratio catalysts. The advantage is that with zeolite catalysts with silica/alumina ratios greater than 10, there is a more facile desorption of the desired polar product prior to further reaction to molecules of higher molecular weight and lower diffusivity, preventing pore blockage and catalyst deactivation. This property is especially important with reactions where the products are more polar than the starting materials. Such reactions are shown in equations 2A and 2B.

Equation 2.

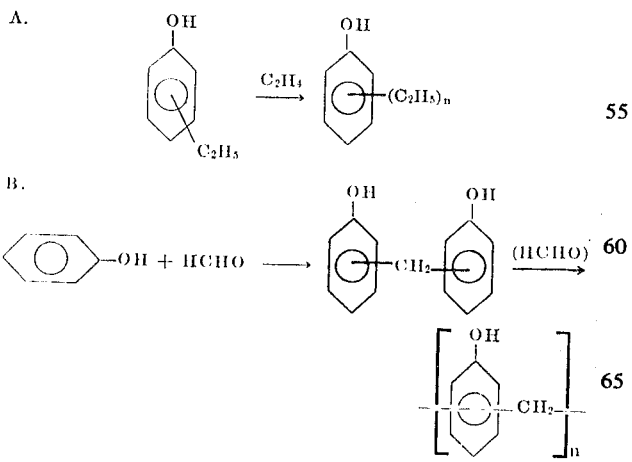

In reactions such as those of equations 2A and 2B, the reaction proceeds to produce a polymer with low silica/alumina ratio catalysts because of the inability of such catalysts to desorb the reaction product. With the catalysts of the instant invention, however, it is possible that the desired product may desorb more easily so that such secondary reactions are greatly reduced.

In addition to the above, crystalline aluminosilicate zeolite catalysts with silica/alumina ratios greater than 10 possess higher thermal stability than do catalysts with lower ratios but otherwise possessing the same crystal structure and having the same cations. A further advantage of crystalline aluminosilicate zeolite catalysts with silica/alumina ratios of more than 10 is their high chemical stability towards chemical reagents. This property permits such high ratio catalysts to withstand acid attack more efficiently, permitting them (among other things) to be regenerated by chemical means rather than by oxidation or the like.

It is accordingly a principal object of the present invention to provide organic conversion reactions in which highly siliceous crystalline aluminosilicate catalysts having a silica/alumina ratio of more than 10 to 1 are employed to catalyze the conversion of polar organic compounds.

The foregoing discussion points out various problems which arise when using crystalline aluminosilicate zeolite catalysts in order to convert organic polar compounds. These difficulties arise due to the presence of a dipole in the polar molecule. The presence of the dipole causes the molecule to become attracted to the active sites in the catalysts. The electrostatic attraction between the catalyst and the polar reactant or polar product results in the adsorption and desorption problems previously discussed.

In a polar compound, there is a separation of charge caused by a non-uniform electron distribution. The non-uniform electron distribution of a polar molecule results from the presence of a hetero atom which has an electronegativity different from that of the carbon atom to which the hetero atoms is bonded. (A hetero atom is defined as an atom other than carbon or hydrogen.)

Whenever an organic compound contains atoms other than carbon and hydrogen, the adsorption and desorption properties of the catalysts will be a notable problem for either a reactant or a product. Thus, the problems to which this application are directed are just as critical when the polar compound is either a reactant or a product of a chemical reaction.

In addition to hetero atoms, functional groups also have electro-negativities which differ from carbon and thereby produce dipoles when bonded to carbon. Thus, organic polar compounds within the contemplation of the present invention are organic compounds which contain one or more hetero atoms and/or one or more functional groups.

The term "hetero" atom is intended to cover any atom other than carbon or hydrogen, representative examples of which are oxygen, sulfur, nitrogen, phosphorous, fluorine, chlorine, bromine, iodine, selenium, arsenic, silicon, etc. The term "functional groups" is intended to cover any functional group in an organic compound.

Specific classes of compounds containing different hetero atoms include by way of example and not by way of limitation are: alcohols, sulfones, amines, phosphonates, halogen substituted hydrocarbons and silanes.

Specific examples of functional groups including representative compounds containing functional groups and hetero atoms which are notable in connection with the adsorption and desorption problems discussed above include:

Acetals and Ketals
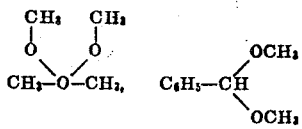

Acid Azides
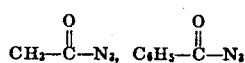

Acid Halides
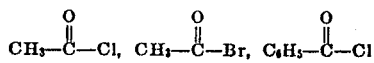

Acids [Carboxylic]
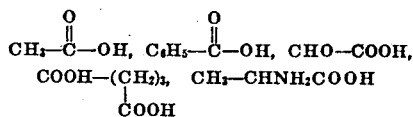

Alcohols
$CH_3CH_2OH$, $C_6H_5CH_2OH$, $CH_2OH-CH_2OH$,

Aldehydes
$CH_3-CHO$, $C_6H_5CHO$, $C_4H_3S-CHO$

Alkylstannanes
$(C_4H_9)_3Sn-O-Sn(C_4H_9)_3$

Amides
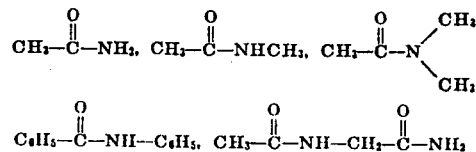

Amidines
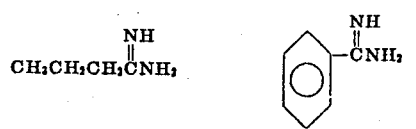

Butanoic acid amidine    Benzoic acid amidine

Amidoximes
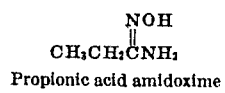
Propionic acid amidoxime

Amines
$CH_3NH_2$   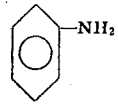   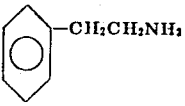

Methylamine   Aniline   β-phenethylamine

Aminoacids
   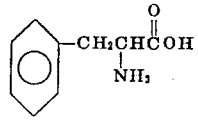

Glycine   Tyrosine

Anhydrides
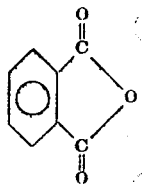 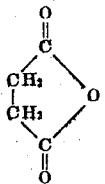 

Phthalic anhydride   Succinic anhydride   Acetic anhydride

Arsenic Miscellaneous Compounds
$(CH_3)_2As-CH_2-CH_2-As(CH_3)_2$

Azides
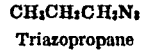
$CH_3CH_2CH_2N_3$
Triazopropane

Azines
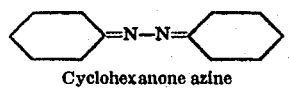
Cyclohexanone azine

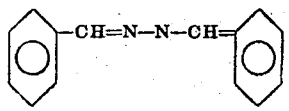
Benzaldehyde azine

Azo compounds
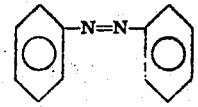
Azobenzene

Azoxy Compounds
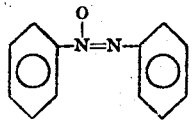
Azoxybenzene

Betaines
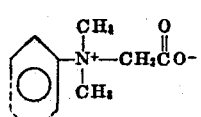
N,N-dimethyl-N-phenylglycine betaine

Carbylamines
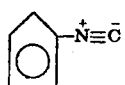   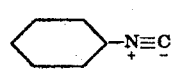
Phenyl isocyanide   Cyclohexyl isocyanide

Cyanates
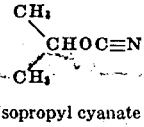   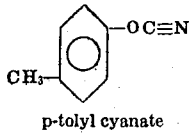
Isopropyl cyanate   p-tolyl cyanate

Cyanides
$CH_3CH_2CN$   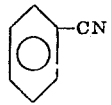   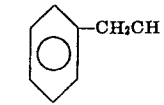
Ethyl cyanide   Benzonitrile   Cyanomethylbenzene

Disulfides
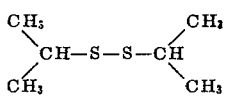
Isopropyl disulfide

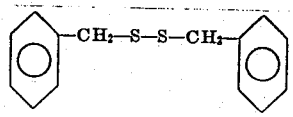
Benzyldisulfide

Epoxy Compounds

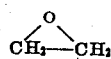 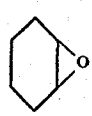 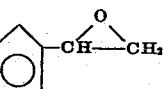

Ethylene oxide   Cyclohexene oxide   Styrene Oxide

Ethers

CH₃CH₂CH₂OCH₂CH₂CH₃ n-propyl ether     Tetrahydrofuran

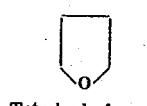

Diphenthernyl

Esters

CH₃COCH₂CH₃   Methyl p-toluate   CH₃CH₂OCCH₂COCH₂CH₃

Ethyl Acetate   Methyl p-toluate   Diethylmalonate

Halides of Acids

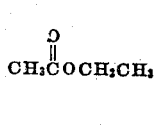   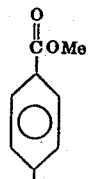

Acetyl chloride    m-nitrobenzoyl chloride

Hemiacetals

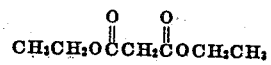

Propionaldehyde    Benzaldehyde
ethylhemiacetal    methylhemiacetal

Heterocyclic Systems

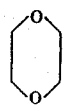 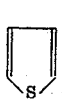 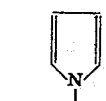 

p-Dioxane   Thiophene   N-methylpyrrole   Furan

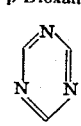 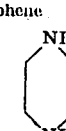 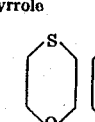 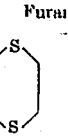

s-triazine   Piperaine   p-thioxane   p-dithiane

Hydrates of aldehydes

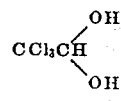

Hydrates of ketones

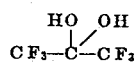

Hydrazides of acids

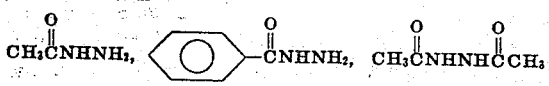

Hydrazine derivatives

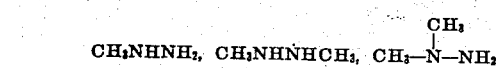

Hydrazones

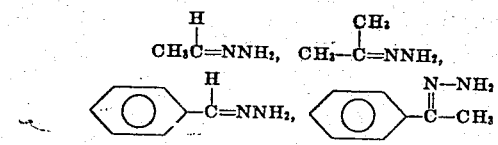

Hydroperoxides

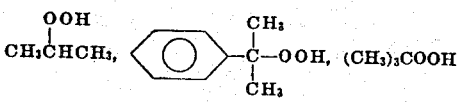

Hydroxamic acids

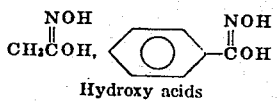

Hydroxy acids

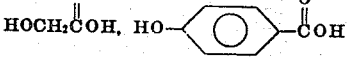

Imides

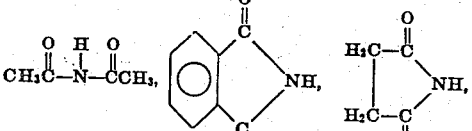

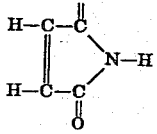

Imidic acids

Imines

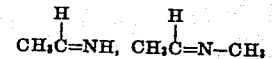

Isocyanates

Isocyanides

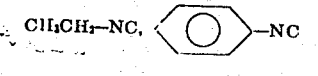

Isothiocyanates

CH₃N=C=S, —N=C=S

Ketenes

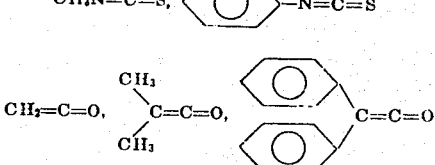

Ketones

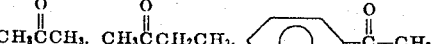

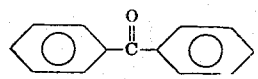

Lactams

Lactones
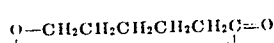

Nitriles

Nitro compounds
$CH_3NO_2$, $C_6H_5NO_2$, $C(NO_2)_4$

Nitrolic acids
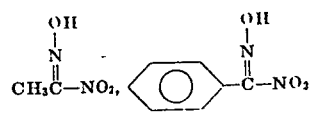

Nitrosolic acids
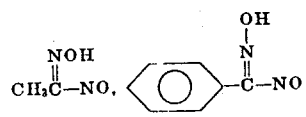

Orthoesters $HC(OCH_2CH_3)_3$ ethyl orthoformate

Oximes
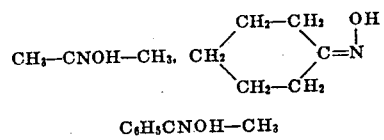

Per-acids
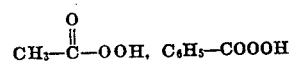

Peroxides
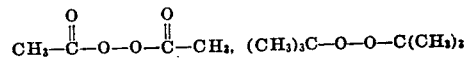

Phenols $C_6H_5OH$, $C_6H_4OH(C_{10}H_{21})$

Phosphates $(C_2H_5O)_3PO$

Phosphine Oxides $(C_6H_5)_3PO$

Phosphines $(C_6H_5)_3P$, $H_2PCH_3$, $(CH_3)_2PCl$, $(C_6H_5)_3P$

Phosphites $(C_2H_5O)_3P$

Phosphonates $(C_2H_5O)_2POH$, $(C_2H_5O)_2POCH_3$

Phosphorus Ylides $(C_6H_5)_3P^+$—$^-CHCH_2CN$

Quinones
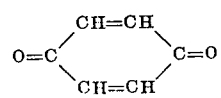

Silanes $(CH_3)_3SiH$

Siloxanes $(CH_3)_3SiOSi(CH_3)_3$

Silylamines $(CH_3)_3Si$—$NH$—$Si(CH_3)_3$

Sulfenic Acids

Sulfides $CH_3$—$S$—$CH_3$, $C_6H_5$—$S$—$C_6H_5$

Sulfinic Acids $C_6H_5SOOH$, $C_2H_5SOOH$

Sulfones $CH_3$—$SO_2$—$CH_3$, $C_6H_5$—$SO_2$—$C_6H_5$

Sulfonic Acids $CH_3$—$SO_3H$, $C_6H_5SO_3H$

Sulfenyl chloride
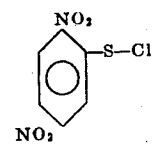

Sulfoxides $CH_3SOCH_3$, $C_6H_5SOC_6H_5$

Sugars $CHO$—$(CHOH)_4$—$CH_2OH$

Thioacids
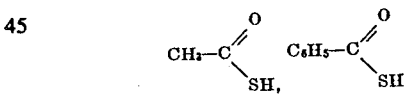

Thioalcohols $CH_3SH$, $C_6H_5SH$

Thioaldehydes $CH_3$—$CHS$, $C_6H_5CHS$

Thiocyanates $C_2H_5SCN$, $C_6H_5SCN$

Thioketones $CH_3CSCH_3$, $C_6H_5CSC_6H_5$

Thiols see thioalchohols

Thiones see thioketones

Thioureas

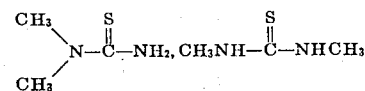

Ureas

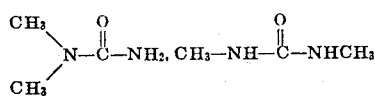

As previously noted, the catalysts usable in the organic conversion reactions of the present invention are crystalline aluminosilicate molecular sieves having a silica/alumina ratio of more than 10 to 1. Generally speaking, any molecular sieve satisfying the foregoing limitation and characterized by the presence of sufficient acidic sites to the th involved reaction is usable in the process of the present inventions. Preferably the pores of the sieve should be sufficiently large to permit ingress of the reactants and egress of the desired reaction products.

Preferably, the silica/alumina ratio of the molecular sieve is up to about 200/1 with best results obtainable with the use of sieves having a silica/alumina ratio of up to about 75/1. Typical examples of such catalysts are described in detail in said copending application Ser. No. 494, 846. For example, in example 8 of said copending application, a high silica NaY aluminosilicate having a silica/alumina ratio of 5. 8 to 1 was converted (after the third contact with ethylenediamine tetraacetic acid, hereafter "EDTA") to a material having a silica/alumina ratio of 12. Example 8 of said application describes an EDTA-treated Y aluminosilicate having a 10.5 silica/alumina ratio. Similarly, in example 26, an NaY aluminosilicate having a silica/alumina ratio of 6.3/1 was converted through EDTA and (NH$_4$)$_2$HEDTA treatments to a catalyst having a silica/alumina ratio of 11.1/1. Base-exchanged materials such as are disclosed in examples 28 to 30 of said copending application may also be utilized in the practice of the present invention.

The process of the present invention is not, however, restricted to the use of crystalline aluminosilicate molecular sieves having the required minimum silica/alumina molar ratio (greater than 10/1) prepared by physically removing alumina from the crystal lattice as disclosed in said copending application Ser. No. 494, 846, for the process can be carried out quite advantageously using other crystalline aluminosilicate molecular sieves having a silica/alumina molar ratio of more than 10 to 1. By way of example, suitable catalysts for carrying out such process include the crystalline aluminosilicate molecular sieve known as "-zeolite beta" described more specifically in U.S. Pat. No. 3, 308, 069, the disclosure of which is hereby incorporated herein by reference. As described in said patent, zeolite beta in one embodiment is a crystalline synthetic material the composition of which has been calculated to be:

[XNa(1.0±0.1—X)TEA] AlO$_2$·YSiO$_2$·WH$_2$O
required minimum silica/alumina molar ratio (greater than 10/1) prepared by physcially removing alumina from the crystal lattice as disclosed in said copending application Ser. No. 494,846, for the process can be carried out quite advantageously using other crystalline aluminosilicate molecular sieves having a silica/alumina molar ratio of more than 10 to 1. By way of example, suitable catalysts for carrying out such process include the crystalline aluminosilicate molecular sieve known as "zeolite beta" described more specifically in U.S. Pat. No. 3, 308, 069, the disclosure of which is hereby incorporated herein by reference. As described in said patent, zeolite beta in one embodiment is a crystalline synthetic material the composition of which has been calculated to be:

[XNa(1.0±0.1—X)TEA] AlO$_2$·YSiO$_2$·WH$_2$O

where X is less than 1, preferably less than 0.75; TEA represents tetraethylammonium ion; Y is greater than 5 but less than 100 and W is up to about 4 depending on the condition of dehydration and on the metal cation present. The TEA component is calculated by difference from the analyzed value of sodium and the ultimate theoretical cation to Al ratio of 1.0/1.

Another embodiment of zeolite beta as disclosed in said patent is a crystalline synthetic material having the composition:

[X/nM(1±0.1—X)H] AlO$_2$·YSiO$_2$·WH$_2$O where X, Y and W have the values listed above and n is the valence of the metal M which can be any metal, preferably a metal of groups 1a, 2a, 3a or one of the transition metals or mixtures thereof as shown in the Mendeleeff periodic chart.

In still another embodiment of zeolite beta as disclosed in said patent, the crystalline synthetic material has the composition:

[X/nM(1±0.1—X)TEA]AlO$_2$·YSiO$_2$·WH$_2$O

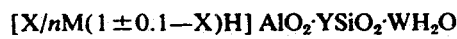

where X, Y, W, n and M have the values listed above. This form of the catalyst is obtained from the initial sodium form of zeolite beta by ion exchange without calcining.

The form of zeolite beta usable in the practice of the present invention is that in which Y in the above identified formulae is more than 10. As noted in said U.S. Pat. No. 3, 308, 069, the more significant d values of the X-ray diffraction pattern for zeolite beta (in its exchanged form) are as follows:

Table A- d Values of Relections in Exchanged Beta

| |
|---|
| 11.4±0.2 |
| 7.4±0.2 |
| 6.7±0.2 |
| 4.25±0.1 |
| 3.97±0.1 |
| 3.0±0.1 |
| 2.2±0.1 |

(When used in the claims, the term "zeolite beta" shall be construed to cover all of the foregoing embodiments of zeolite beta.)

Details of preparation of zeolite beta are disclosed in said patent 3,308,069 in examples 1 (silica/alumina: 13.9/1); 6 (silica/alumina: 29.6/1); 7 (silica/alumina:30.4/1) and 9 (silica/alumina: 17.4/1).

Another crystalline aluminosilicate usable in the process of the present invention is one which has been designated ZSM-5. Catalyst ZSM-5 is a crystalline aluminosilicate having the composition, expressed in mole ratios of oxides, as follows:

$$0.9 \pm 0.2\ M_{2/n}O:Al_2O_3 \cdot wSiO_2 \cdot yH_2O$$

wherein M is at least one cation and n is its valence, w is 5-100 and y is from 0-40.

Members of the family of ZSM-5 zeolites possess a definite distinguishing crystalline structure whose X-ray diffraction pattern shows the following significant lines:

TABLE B

| Interplanar Spacing d (A) | Relative Intensity |
|---|---|
| 11.1 ± 0.3 | S |
| 10.0 ± 0.3 | S |
| 7.4 ± 0.2 | W |
| 7.1 ± 0.2 | W |
| 6.3 ± 0.2 | W |
| 6.04± 0.2 | W |
| 5.97± 0.2 | W |
| 5.69± 0.1 | W |
| 5.56± 0.1 | W |
| 5.01± 0.1 | W |
| 4.60± 0.1 | W |
| 4.35± 0.1 | W |
| 4.25± 0.1 | W |
| 3.85± 0.1 | VS |
| 3.75±0.05 | S |
| 3.71±0.05 | S |
| 3.64±0.05 | M |
| 3.04±0.05 | W |
| 2.99± 0.05 | W |
| 2.94± 0.05 | W |

The above were determined by standard techniques. The radiation was the K-alpha doublet of copper, and a scintillation counter spectrometer with a strip chart pen recorder was used. The peak heights, I, and the positions as a function of 2 times theta, where theta is the Bragg angle, were read from the spectrometer chart. From these, the relative intensities, 100 $I/I_o$, where $I_o$ is the intensity of the strongest line or peak, and d (obs.), the interplanar spacing in A, corresponding to the recorded lines, were calculated. In Table A the relative intensities are given in terms of the symbols S=strong, m=medium, ms=medium strong, mw=medium weak and vs=very strong. It should be understood that this X-ray diffraction pattern is characteristic of all the species of ZSM-5 compositions. Ion exchange of the sodium ion with cations reveals substantially the same pattern with some minor shifts in interplanar spacing and variation in relative intensity. Other minor variations can occur depending on the silicon to aluminum ratio of the particular sample, as well as if it has been subjected to thermal treatment.

ZSM-5 zeolites can be used either in the alkali metal form, e.g., the sodium form, the ammonium form, the hydrogen form, or another univalent or multivalent cationic form. Preferably, one or other of the last two forms is employed. They can also be used in intimate combination with a hydrogenating component such as tungsten, vanadium, molybdenum, rhenium, nickel, cobalt, chromium, manganese, or a noble metal such as platinum or palladium where a hydrogenation dehydrogenation function is to be performed. Such component can be exchanged into the composition, impregnated therein or physically intimately admixed therewith. Such component can be impregnated in or on to ZSM-5 such as, for example, by, in the case of platinum, treating the zeolite with a platinum metal-containing ion. Thus, suitable platinum compounds include chloroplatinic acid, platinous chloride and various compounds containing the platinum ammine complex.

The compounds of the useful platinum or other metals can be divided into compounds in which the metal is present in the cation of the compound and compounds in which it is present in the anion of the compound. Both types of compounds which contain the metal in the ionic state can be used. A solution in which platinum metals are in the form of a cation or cationic complex, e.g., $Pt(NH_3)_6Cl_4$ is particularly useful. For some hydrocarbon conversion processes, this noble metal form of the ZSM-5 catalyst is unnecessary such as in low temperature, liquid phase ortho xylene isomerization.

ZSM-5, when employed either as an adsorbent or as a catalyst in one of the aforementioned processes, should be dehydrated at least partially. This can be done by heating to a temperature in the range of 200° to 600°C. in an inert atmosphere, such as air, nitrogen, etc. and at atmospheric or subatmospheric pressures for between 1 and 48 hours. Dehydration can also be performed at lower temperatures merely by placing the ZSM-5 catalyst in a vacuum, but a longer time is required to obtain a sufficient amount of dehydration.

Zeolite ZSM-5 can be suitably prepared by preparing a solution containing tetrapropyl ammonium hydroxide, sodium oxide, an alumina and silica source, and water and having a composition, in terms of mole ratios of oxides, falling within the following ranges:

TABLE C

|  | Broad | Preferred | Particularly Preferred |
|---|---|---|---|
| OH⁻/SiO₂ | 0.07-10 | 0.1-2.0 | 0.2-0.75 |
| R₄N⁺/(R₄N⁺+Na⁺) | 0.2-0.95 | 0.3-0.9 | 0.4-0.9 |
| H₂O/OH⁻ | 10-300 | 10-300 | 10-300 |
| SiO₂/Al₂O₃ | 5-100 | 10-60 | 10-40 | wherein R is propyl, and maintaining the mixture until crystals of the zeolite are formed. Thereafter, the crystals are separated from the liquid and recovered. Typical reaction conditions consist of heating the foregoing reaction mixture to a temperature of from about 100°C. to 175°C. for a period of time of from about six hours to sixty days. A more preferred temperature range is from about 150° to 175°C. with the amount of time at a temperature in such range being from about 12 hours to 8 days.

The digestion of the gel particles is carried out until crystals form. The solid product is separated from the reaction medium, as by cooling the whole to room temperature, filtering, and water washing.

The foregoing product is dried, e.g., at 230°F., for from about 8 hours to 24 hours. Of course, milder conditions may be employed if desired, e.g., room temperature under vacuum.

ZSM-5 can be prepared utilizing materials which supply the appropriate oxide. Such compositions include for an aluminosilicate, sodium aluminate, alumina, sodium silicate, silica hydroxol, silica gel, silicic acid, sodium hydroxide and tetrapropylammonium hydroxide. It will be understood that each oxide component utilized in the reaction mixture for preparing a member of the ZSM-5 family can be supplied by one or more initial reactants and they can be mixed together in any order. For example, sodium oxide can be supplied by an aqueous solution of sodium hydroxide or by an aqueous solution of sodium silicate; tetrapropylammonium cation can be supplied by the bromide salt. The reaction mixture can be prepared either batchwise or continuously. Crystal size and crystallization time of the ZSM-5 composition will vary with the nature of the reaction mixture employed. The form of catalyst ZSM-5 usable in the practice of the present invention is that in which the silica/alumina molar ratio is greater than 10/1.

[Note: The crystalline aluminosilicate ZSM-5 per se forms no part of the present invention; it is only the use of ZSM-5 in the processes of the present invention that is herein claimed.]

Mordenite may be converted to a catalyst having a silica/alumina ratio of greater than 10/1 by steaming, followed by HCl extraction and water washing. The resulting product (referred to herein as "dealuminized mordenite") is usable in carrying out the processes of the present invention.

The following examples serve to illustrate the present invention:

Example 1: Preparation of Chelated REY

The catalyst used in examples 2-3 was a chelated rare earth zeolite Y (REY) having a silica/alumina ratio of 19.5/1. A high silica Y faujasite was synthesized by the procedure set forth in Belgium Patent No. 598582. Preparational details of this synthesis were as follows:

Solution A
  Caustic Aluminate Solution
  900 g. NaAlO$_2$ (Nalco 44.5% Al$_2$O$_3$, 33.5 Na$_2$O)
  534 g. NaOH 77.5 wt.% Na$_2$O
  2832 cc. H$_2$O
Solution B
  7344 g. (6108 cc) Ludox LS 30 wt.% SiO$_2$ Solution B was added to freshly prepared warm solution A while being stirred vigorously. Stirring was continued for an additional 30 minute period after addition. The resulting slurry was split into three four-liter battery jars and allowed to age at room temperature for 20–24 hours. Following the room aging the containers were covered and placed in a hot water bath at 200°F and held for 192 hours until a crystalline faujasite product was formed. At this point the crystalline product was separated from the supernatant liquid by filtration and washing.

The composition of the sodium Y as prepared by the procedure above was Na, wt.% 8.6, Al$_2$O$_3$, wt.% 19.0, SiO$_2$, wt.% 68.7, x-ray analysis showed the product to be 75 percent crystalline.

225 g. of the above dry NaY catalyst was contacted four times for 24 hours each at 200°F. with 20 g. EDTA (Ethylene Diamine Tetra Acetic Acid) and 200 cc water to reduce alumina content by chelation. After each contact the filter cake was washed with 200 cc. of water.

Following the EDTA treatment, which reduces the alumina content, the dealuminized faujasite was ion exchanged with a continuous flow of 90 lbs. of solution containing 5 wt.% RECl$_3$·6H$_2$O + 2 wt.% NH$_4$Cl over a 24 hour period followed by water washing until the effluent was essentially free of soluble chloride ion.

The exchanged faujasite was dried at 230°F, pelleted and sized 4 to 10 mesh Tyler, calcined for 10 hours at 1000°F followed by steam treatment at 1200°F for 72 hours with steam at 15 psig.

Composition of the rare earth exchanged catalyst was (RE)$_2$O$_3$, wt.% 6.7, Al$_2$O$_3$, wt.% 7.4, SiO$_2$, wt.% 84.6, Na, wt.% 0.24, SiO$_2$/Al$_2$O$_3$ molar ratio of 19.5.

Example 2: Condenstation of Phenol with Formaldehyde over Chelated REY (19.5/1)

Sixty-four grams of phenol and 5 grams of the finely-powdered catalyst of example 1 (previously calcined for 3 hours at 500°F. in a helium flow) were heated with stirring to the reaction temperature (i.e., about 182°C.). A solution containing 6.6 grams of trioxane, the crystalline trimer of formaldehyde, in 50 cc of benzene solvent, was introduced through a long stainless steel needle inserted well below the surface of the reaction mixture. The trioxane solution was metered into the needle by a motor-driven syringe pump over a period of about 1.75 hours. The reaction was terminated and gas chromatographic examination of the reaction mixture was effected. About 1.9 wt % of higher boiling products were observed whose retention times corresponded to the expected bisphenol products, C$_{13}$H$_{12}$O$_2$.

Example 3: Reaction of 1-Decene and Phenol over Chelated REY (19.5/1)

A mixture of phenol (60 gm) and 1-decene (28.2 gm) was stirred for 1½ hours at 182°C. in the liquid phase with 3.0 grams of the catalyst of example 1. The catalyst had previously been calcined for 3 hours in helium 500°F. The reaction was terminated, the catalyst filtered off, and the reaction products examined by gas chromatography and spectroscopy. About 2.2 percent conversion of reactants to products whose retention times corresponded to monoalkylate was observed.

Example 4: Preparation of H-ZSM-5 (42.6/1)

3.19 gm. NaAlO$_2$ were dissolved in 99 ml. of a 2.37 NTPA-OH (tetrapropyl ammonium hydroxide) solution and 9 ml. hot water. To this was added 76.3 gm. Ludox and mixed until a smooth, creamy gel formed. The gel was placed in a pyrex liner in an autoclave, run five days at 175°C., cooled, removed and washed with one liter of water. The product was dilatent and mainly crystalline with crystal sizes of less than one micron. The product was dried at 230°F. and calcined for ten hours at 1000°F. in air. The product was identified by X-ray analysis as ZSM-5. The physical properties are given below:

| | |
|---|---|
| Wt. % SiO$_2$ | 94.6 |
| Wt. % Al$_2$O$_3$ | 3.8 |
| Wt. % Na | 1.44 |
| SiO$_2$/Al$_2$O$_3$ | 42.3 |
| Wt. % H$_2$O | 6.50 |
| n-hexane adsorption | 10.5 |
| cyclohexane adsorption | 5.07 |
| m$^2$/g | 230 |
| crystallinity | 80 % |

An exchange product was also prepared by reacting the abovedescribed product with ammonium chloride. In this exchange the sodium ions present were exchanged by ammonium ions. The silica/alumina ratio of the exchange product was also 42.3/1. The exchange product was prepared by treating ZSM-5 with a saturated NH$_4$Cl solution for 5 hours at room temperature with stirring. The product was filtered and a fresh solution of 25 wt % NH$_4$Cl was added and reacted for 16 hours at 100°C., filtered, and again reacted with fresh solution of 25 wt % NH$_4$Cl, water washed to remove all chloride ions and dried at 230°F.

Example 5: Reaction of 1-Decene and Phenol over H-ZSM-5 (42.6/1)

A mixture of phenol (19 gm) and 1-decene (28.2 gm) was stirred for 1½ hours at 182°C. in the liquid phase with 1/12 its weight of the H-ZSM-5 catalyst of example 4. The catalyst had previously been calcined for 2 hours in air at 900°F. The reaction was terminated, the catalyst filtered off and the reaction products examined by gas chromatography and spectroscopy. About 1 percent conversion of reactants to alkylate was observed.

Examples 6–19

The following representative reactions, involving at least one polar molecule and a high silica/alumina crystalline aluminosilicate zeolite, were carried out in sealed glass vessels, as opposed to flow systems, to assure sufficiently high conversion to allow for isolation and identification of the major reaction product (s). Each of the following reactions was carried out in the same fashion. Reactants and zeolite were charged into a glass ampoule and heated at autogenous pressure for 3 hours at 200°–250°C. The tubes were opened, approximate conversions determined by gas, liquid chromotography and the major reaction product(s) isolated by preparative gas, liquid chromatography and identified by infrared comparison to an authentic sample.

In these representative reactions four different sieves were employed. The preparation of catalyst beta having a 23.3/1 silica/alumina ratio, utilized in examples 10 and 13, is described in example 6. The preparation of catalyst HZSM-5 having a 17/1 silica/alumina ratio, utilized in examples 11 and 15, is described in example 7. The preparation of catalyst HZSM-5 having a 37/1 silica/alumina ratio, utilized in example 12, is described in example 8. The preparation of the dealuminized mordenite catalyst having a silica/alumina ratio of 39.2/1, utilized in examples 14 and 16–19, is described in example 9.

Example 6: Preparation of Zeolite Beta (23.3/1)

4.4 grams of sodium aluminate (made by reacting 41.8 wt % Al$_2$O$_3$ with 31.3 wt % Na$_2$O) was added to 41.6 grams of a 40 percent aqueous solution of tetraethylammonium hydroxide and 109 grams of Ludox (containing 30 wt % of SiO$_2$). The collodial silica was added last. The mixture was vigorously agitated for ten minutes. The constituents were then added to a sealed autoclave and heated to and held at 300°F. for 4–6 days, generating a pressure of 190 to 400 psig. The final product was separated by filtration followed by water washing and drying at 230°F.

The typical analysis of the beta aluminosilicate product was: sodium, 0.37 wt %; Al$_2$O$_3$, 7.1 wt %; SiO$_2$, 93.2 wt %. The adsorptive properties of the product were as follows:

| | Wt. % |
|---|---|
| cyclohexane | 10-20 |
| n-hexane | 10-17 |
| water | 15 |

32.2 gram of oven dried material prepared as described above was contacted four times with 5 wt % of NH$_4$Cl solution for three one-hour contacts and one overnight contact at 190°F. The crystalline aluminosilicate was separated from the contacting solution after each contact by filtration. After final contact the sample was water washed and then dried at 230°F., followed by calcination at 1000°F. for ten hours.

The final chemical and physical properties of the product were as follows:

| | Wt. % |
|---|---|
| Na | 0.05 |
| Al$_2$O$_3$ | 6.63 |
| SiO$_2$ | 91.0 |

(silica/alumina molar ratio=23.3)
The adsorptive properties of the product were as follows:

| | Wt.% |
|---|---|
| Cyclohexane | 19.3 |
| n-hexane | 17.4 |
| water | 11.3 |

The final surface area of the catalyst was 575 meters$^2$/gram.

Example 7: Preparation of Zeolite HZSM-5 (17/1)

In the preparation of this catalyst the quaternary ammonium aluminosilicate was synthesized first by the following process which involved recycling the supernatant liquor from a previous preparation.

The initial preparation consisted of reacting the following solutions:
Solution A
15.6 g. NaOH (97.3 st.% NaOH)
1200 cc H$_2$O
374.0 g. TPABr (tetra propyl ammonium bromide)

Solution B
  19.2 g. NaAlO$_2$ (44.5 wt.% Al$_2$O$_3$, 31.6 wt.% Na$_2$O
  1200 cc H$_2$O
Solution C
  460 g. Ludox 30 wt.% SiO$_2$ These solutions were mixed in the following order: solution B added to solution A, finally solution C (Ludox) was added to this mixture and stirred for 15 minutes and charged to a stirred autoclave. Stirring was continued during the run. The reaction was allowed to continue for 70 hours at a temperature of 249° to 309°F and at a pressure of 18 to 65 psig until crystallization of the ZSM-5 product was obtained. The product was separated from the supernatant solution by filtration and washing. This solution was then reused for the preparation of the Na TPA ZSM-5 used in instant catalyst.

In preparing the particular Na TPA ZSM-5 of this example, 2840 grams of the mother liquor separated from product ZSM-5 above was used. To this was added depleted components: 13.6 g. NaOH (97.3 wt.% NaOH), 16.8 g. NaAlO$_2$ (44.5 wt.% Al$_2$O$_3$, 31.6 wt. % Na$_2$O) and silica as 120 g. Cab-O-Sil (100% SiO$_2$) as fine powder. These components were charged to a stirred autoclave, held for 90 hours at 282°–298°F under a 52 to 61 psig pressure. The resulting Na TPA ZSM-5 product was separated from the liquor by filtration and washing.

The composition of the product at this point was

Na, wt.% 1.5

Al$_2$O$_3$, wt.% 8.8

SiO$_2$, wt.% 88.8

SiO$_2$/Al$_2$O$_3$ molar ratio of 17.2

The product by x-ray analysis was 85% crystalline when compared to an established standard.

In preparing the instant acid ZSM-5 form, 105 g. of the above Na TPA ZSM-5 was contacted 7 times, 5 one hour and 2 overnight, with a 5 wt.% NH$_4$Cl solution at room temperature, followed by water washing until the effluent water was essentially free of residual chloride. The water washed product was air dried at 230°F and calcined for 10 hours at 1000°F.

The final product had a residual sodium content of 0.48 wt.%.

This calcined product was used in the subsequent conversion process.

Example 8: Preparation of Zeolite HZSM-5 (37/1)

The ZSM-5 crystalline aluminosilicate used in preparing this catalyst was synthesized by reacting the following solutions:
Solution A
  0.56 lbs. NaAlO$_2$ (44.7 wt.% Al$_2$O$_3$, wl.6 wt.% Na$_2$O)
  14.0 lbs. Water
Solution B
  44.7 lbs. Q-Brand Silicate (28.9 wt.% SiO$_2$, 8.9 wt.% Na$_2$O)
  56.0 lbs. Water
Solution C
  5.6 lbs. TPABr (tetra propyl ammonium bromide)
  28.0 lbs. Water Solution D
  4.47 lbs. H$_2$SO$_4$
  14.0 lbs. Water These solutions were intermixed in the following order: solution C added into solution B, then solution A added to this combination and finally solution D was added. This mixture, a firm gel type slurry, was further mixed until a thick slurry resulted. This slurry was held at a temperature of 180°–212°F with steam heated submerged heating coils for 167 hours at atmospheric pressure until the crystalline product of adaquate crystallinity was formed. The resulting product was separated from the supernatant liquor by filtration and washing.

The composition of the final product on dry basis was

Na, wt. % 0.8

N, wt. % 0.52

Al$_2$O$_3$, wt.% 4.4

SiO$_2$, wt.% 96.8

SiO$_2$/Al$_2$O$_3$ molar ratio 37/1

X-ray analysis show this product to be 90 percent crystalline when compared to an established standard.

In preparing the acid ZSM-5 form of this example, a quantity of the above Na TPA ZSM-5 was first dried at 230°F and then calcined for 10 hours at 1000°F to remove the TPA ion by oxidation prior to ion exchange with NH$_4$Cl to reduce the residual sodium content.

The ion exchange process involved contacting 939 g. of the calcined Na ZSM-5 with a 10 wt.% NH$_4$Cl solution for three one hour and one overnight contacts at room temperature with stirring. In each contact 2.07 lbs. NH$_4$Cl was dissolved in 19.7 lbs. water. After the fourth contact the product was washed essentially free of chloride ion, and dried at 230°F. A part of this batch was calcined for 10 hours at 1000°F and used in the catalysis of the polar compounds.

The residual sodium of the final calcined catalyst was 0.02 wt.% Na.

Example 9: Preparation of Dealuminized Mordenite (39.2/1)

H-mordenite (Norton Co., Code B6-10) was steamed for 2 hours at 1000°F., then extracted continuously with 50 cc per gram of catalyst of 1.0 NHCl at 180°F. over a 16 hour period, water washed until the extract was chloride ion-free and dried overnight in a 110°C. oven. The cycle was repeated 12 times. Following is an analysis of the product:

|  | Fresh | After 1st Cycle | After 12th Cycle |
|---|---|---|---|
| SiO$_2$, wt % |  | 91.7 | 94.2 |
| Al$_2$O$_3$, wt % |  | 7.6 | 4.08 |
| SiO$_2$/Al$_2$O$_3$ | 11.0 | 20.5 | 39.2 |
| Adsorption, wt % |  |  |  |
| H$_2$O |  | 8.4 | 2.2 |
| n-C$_6$ |  | 5.5 | 3.9 |
| Cy-C$_6$ |  | 6.7 | 5.7 |

Example 10

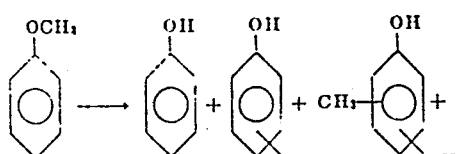

higher molecular weight alkalated phenols catalyst:-catalyst beta of example 6 (silica/alumina: 23.3/1).
amounts: catalyst beta .5 g

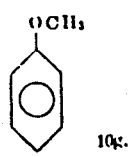 10g.

conversion: approximately 100 percent

Example 11

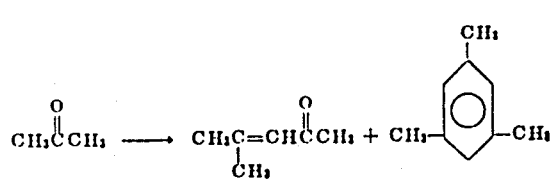

catalyst: HZSM-5 of example 7 (silica/alumina: 17/1)

amounts:

catalyst..................................................................1 g.

..................................................................10 g.

conversion: 25 percent
other data:

6.5 grams of unreacted acetone was removed by distillation leaving a 3.5 residue which contained 1 gram of acetone a mixture of mesityl oxide and mesitylene in a 9 to 1 ratio.

Example 12

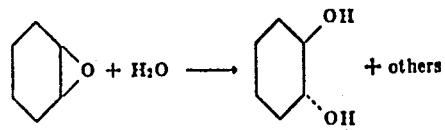 + others catalyst: HZSM-5 of example 8 (silica/alumina: 37/1)

amounts:
catalyst                                  1 g

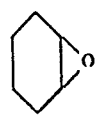

| | |
|---|---|
| $H_2O$ | 10 g |
| | 1 g |
| trans-1,2-cyclohexanediol | 4 g |
| conversion: | 90 % |
| other data: | |

The catalyst was removed by filtration yielding 4 grams of crude trans-1,2-cyclohexanediol.

Example 13

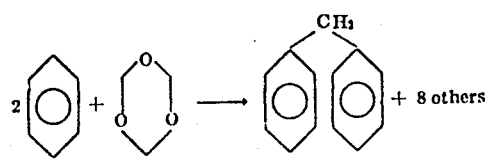 + 8 others catalyst: catalyst beta of example 6 (silica/alumina: 23.3/1)
amounts:

| | |
|---|---|
| catalyst | .1 g |
|  | 8 g |
| 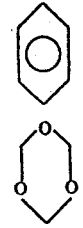 | 1 g |
| conversion: | 15 % |
| other data: | |

6 grams of benzene and trioxane were removed. The remaining material was composed of nine products 41 percent of which was diphenylmethane.

Example 14

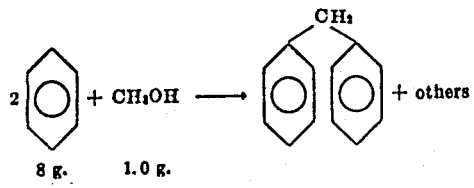 + others 8 g.         1.0 g.

catalyst: dealuminized mordenite of example 9 (silica/alumina: 39.2/1)
amounts:

| | |
|---|---|
| catalyst | .2 g |
|  | 8 g |
| $CH_3OH$ | 1.0 g |
| conversion: | 40% |
| other data: | |

7.2 grams of unreacted benzene and methanol were removed leaving .3 grams of high boiling material of which most was diphenylmethane.

Example 15

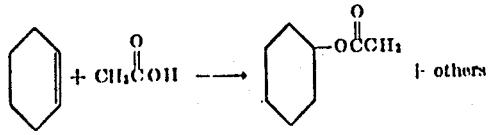 + others catalyst: HZSM-5 of example 7 (silica/alumina: 17/1)
amounts:

catalyst .2 g

8.0 g

CH₃C OH 1.0 g
conversion: 60 %
other data:

5.1 gram of unreacted starting material was removed by distillation. Cyclohexyl acetate was shown to be the major component in the high boiling residue

Example 16

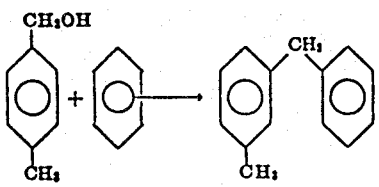

catalyst: Dealuminzed mordenite of example 9 (silica/alumina: 39.2/1)
amounts:

catalyst .2 g 1.0 g

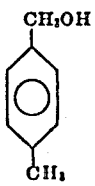

8.0 g
conversion: 100 %
other data:

Excess benzene was removed and the residue distilled, yielding 1.0 g of p-methyldiphenylmethane with a b.p. of 130°–133°C. at 3 mm.

Example 17

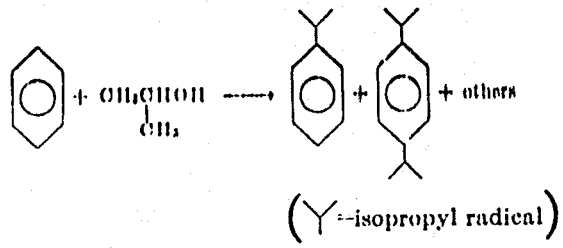

(Y—isopropyl radical)

catalyst: Dealuminized mordinite of example 9 (silica/alumina:39.2/1)
amounts:

catalyst .2 g

8.0 g

CH₃CHOH 1.0 g
   |
   CH₃ conversion: 90 %
other data:

The catalyst was removed to yield 6.2 gram of unreacted benzene and isopropanol. Examination of the high boiling residue showed it to contain camene as a major product with a small amount of p-disopropylbenzene and a trace of o-disopropylbenzene.

Example 18

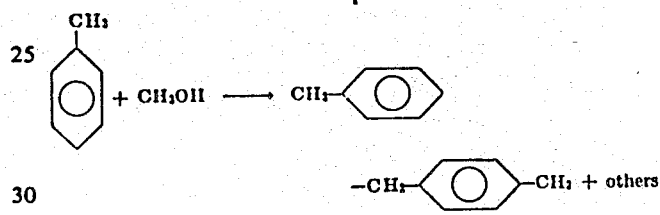

catalyst: Dealuminzed mordenite of example 9 (silica/alumina: 39.2/1)
amounts:

catalyst .2 g

8.0 g
CH₃OH                    1.0 g
conversion:              40 %
other data:

6.9 grams of unreacted toluene and methanol were removed, yielding as a major product, in the complex residue p-ditolylmethane.

Example 19 catalyst: Dealuminizd mordenite of example 9 (silica/alumina: 39.2/1)
amounts:

catalyst            2. g
                    8. g
CH₃OH               1. g
conversion:         50 %
other data:

4.7 gram of unreacted cyclohexene and methanol were removed. The remaining residue contained cyclohexyl methyl ether and cyclohexyl-cyclohexane in a 1/1 ratio.

Other reactions which are more efficiently converted by the catalysts of the present invention include by way of further example the following:

19. 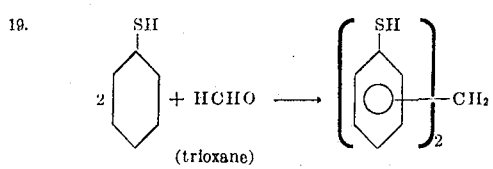
(trioxane)

20. 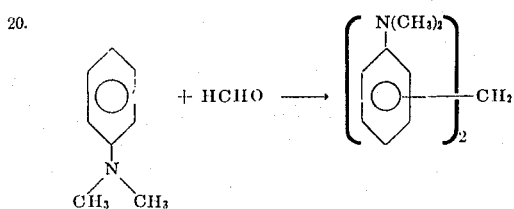

21. 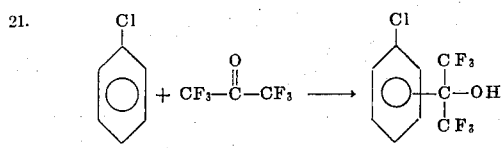

22. 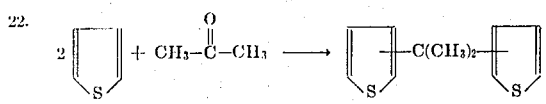

23. 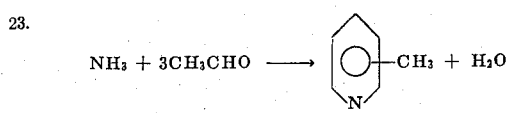

24. 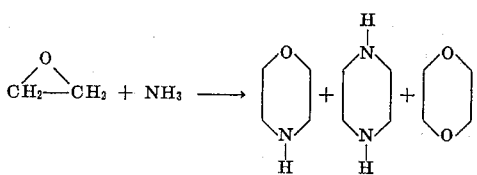

In the foregoing portions of the specification, a novel process for converting polar organic compounds by means of crystalline aluminosilicate catalysts with silica/alumina ratios greater than 10 has been set forth. It is to be understood, however, that the practice of the present invention is also applicable to isomorphs of said crystalline aluminosilicates. For example, the aluminum may be replaced by elements such as gallium and silicon by elements such as germanium.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalence of the claims are therefore intended to be embraced therein.

I claim:
1. A process for converting an organic compound selected from the group consisting of cyclohexene, benzene and toluene by reacting the same with an alcohol selected from the group consisting of methanol, tolyl carbinol, and isopropanol in the presence of a catalyst of dealuminized mordenite characterized by a silica to alumina ratio of more than 10 to 1.
2. The process of claim 1 wherein the alcohol is methanol.
3. The process of claim 1 wherein the alcohol is isopropanol.
4. The process of claim 1 wherein the alcohol is tolyl carbinol.

* * * * *